(12) United States Patent
Middeke et al.

(10) Patent No.: US 10,377,947 B2
(45) Date of Patent: Aug. 13, 2019

(54) COMPOSITION AND PROCESS FOR METALLIZING NONCONDUCTIVE PLASTIC SURFACES

(71) Applicant: Atotech Deutschland GmbH, Berlin (DE)

(72) Inventors: Hermann Middeke, Falkensee (DE); Steve Schneider, Berlin (DE); Carl Christian Fels, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 16/238,596

(22) Filed: Jan. 3, 2019

(65) Prior Publication Data

US 2019/0144747 A1    May 16, 2019

Related U.S. Application Data

(62) Division of application No. 15/112,700, filed as application No. PCT/EP2015/056195 on Mar. 24, 2015, now Pat. No. 10,174,250.

(30) Foreign Application Priority Data

Apr. 1, 2014   (EP) .................................... 14163083

(51) Int. Cl.
*C09K 13/02*   (2006.01)
*C25D 5/56*    (2006.01)
*C23C 18/20*   (2006.01)
*C23C 18/24*   (2006.01)
*C23C 18/30*   (2006.01)
(Continued)

(52) U.S. Cl.
CPC .............. *C09K 13/02* (2013.01); *C23C 18/20* (2013.01); *C23C 18/2086* (2013.01); *C23C 18/22* (2013.01); *C23C 18/24* (2013.01); *C23C 18/30* (2013.01); *C25D 5/54* (2013.01); *C25D 5/56* (2013.01); *C23C 18/1653* (2013.01)

(58) Field of Classification Search
None
See application file for complete search history.

(56) References Cited

U.S. PATENT DOCUMENTS 3,650,859 A    3/1972  D'Ottavio
4,204,013 A    5/1980  Arcilesi et al.
(Continued)

FOREIGN PATENT DOCUMENTS

CN      1715444     1/2006
CN      101835924   9/2010
(Continued)

OTHER PUBLICATIONS

Search Report for corresponding Chinese Application No. 201580018742.X dated Jun. 8, 2018.
(Continued)

*Primary Examiner* — Nathan T Leong
(74) *Attorney, Agent, or Firm* — Renner, Otto, Boisselle & Sklar, LLP (57) ABSTRACT

The present invention relates to a process for metallizing electrically nonconductive plastic surfaces of articles using the etching solution. The etching solution is based on a stabilized acidic permanganate solution. After the treatment with the etching solution, the articles can be metallized.

14 Claims, 4 Drawing Sheets

(51) Int. Cl.
*C23C 18/22* (2006.01)
*C25D 5/54* (2006.01)
*C23C 18/16* (2006.01)

(56) References Cited

U.S. PATENT DOCUMENTS

| | | | |
|---|---|---|---|
| 6,861,097 | B1 | 3/2005 | Goosey et al. |
| 2005/0266165 | A1 | 12/2005 | Mobius et al. |
| 2011/0140035 | A1 | 6/2011 | Schildmann et al. |

FOREIGN PATENT DOCUMENTS

| | | |
|---|---|---|
| CN | 103305822 | 9/2013 |
| DE | 94540 | 12/1972 |
| EP | 1600528 | 11/2005 |
| EP | 2657367 | 10/2013 |
| GB | 2428885 | 2/2007 |
| GB | 2428885 * | 7/2007 |
| JP | 2003/013244 | 1/2003 |
| SU | 1104377 | 7/1984 |
| WO | 2013135864 | 9/2013 |

OTHER PUBLICATIONS

Database WPI Week 198507, Jul. 23, 1984; Thomson Scientific, London, GB; AN 1985-043578, XP002729297 and SU 1104377A1.
Database WPI Week 201378; XP002729296.Thomson Scientific, London, GB; and CN 103305822.
PCT/EP2015/056195; PCT International Search Report and Written Opinion of the International Searching Authority dated Jun. 11, 2015.
PCT/EP2015/056195; PCT International Preliminary Report on Patentability dated Jun. 22, 2016.

* cited by examiner

Figure 4

COMPOSITION AND PROCESS FOR METALLIZING NONCONDUCTIVE PLASTIC SURFACES

CROSS-REFERENCE TO RELATED APPLICATIONS

The present application is a division of and claims priority under 35 U.S.C. § 120 to U.S. application Ser. No. 15/112,700, now U.S. Pat. No. 10,174,250, which in turn is a U.S. National Stage Application based on and claiming benefit and priority under 35 U.S.C. § 371 of International Application No. PCT/EP2015/056195, filed 24 Mar. 2015, which in turn claims benefit of and priority to European Application No. 14163083.0 filed 1 Apr. 2014, the entirety of each of which is hereby incorporated herein by reference.

FIELD OF THE INVENTION

The present invention relates to a composition of an etching solution and a process for metallizing electrically nonconductive plastic surfaces of articles using the etching solution. The etching solution is based on a stabilized acidic permanganate solution. After the treatment with the etching solution, the articles can be metallized.

BACKGROUND OF THE INVENTION

Articles made from electrically nonconductive plastic can be metallized by an electroless metallization process or alternatively by a direct electroplating process. In both processes, the article is first cleaned and etched. The etching is typically undertaken by means of chromosulphuric acid. The etching serves to make the surface of the article receptive to the subsequent metallization, such that the surfaces of the articles are well-wetted with the respective solutions in the subsequent treatment steps and the deposited metal ultimately has sufficiently firm adhesion on the surface.

After etching, the plastic is activated for the electroless metallization by means of an activator comprising a noble metal, and then metallized electrolessly. Subsequently, a thicker metal layer can also be applied electrolytically. In the case of the direct electroplating process, which does not need an electroless metallization, the etched surface is typically treated with a palladium colloid solution. Subsequently, the surface is contacted with an alkaline solution comprising copper ions complexed with a complexing agent to increase the conductivity. This step leads to the formation of a copper layer and hence to a metal layer on the surface of the article with elevated conductivity. Thereafter, the article can be directly electrolytically metallized (EP 1 054 081 B1).

A further possibility to provide a sufficient electrically conductive layer on the etched surface is to treat it with a metal ion solution and afterwards with a sulphide solution. These two treatment steps generate an electrically conductive metalsulfide layer on the etched surface prior to metallizing it by direct electroplating (EP 1 0010 52 A2).

As etching solutions based on chromosulphuric acid are toxic, the literature describes attempts to replace it with etching solutions comprising permanganate salts.

EP 202 57 08 A1 discloses a pickling solution and a pickling process for pickling ABS plastic surfaces or ABS polymer blend surfaces prior to a subsequent metallization of these surfaces. The pickling solution includes Mn(VII) ions and an inorganic acid. The pickling solution is free of alkali and alkaline earth ions which is achieved by generating the Mn(VII) ions by anodic oxidation of manganese(II) salts. Redox mediators like Ag (I), Bi(V), V(V), Mo(VI), Cu(II), Ti(II), Au(I), Fe(II), Ce(III), or Sb(II) ions may be added in order to increase the efficiency of the anodic oxidation. The absence of alkali metal permanganate compounds overcomes the problem of rapid self-decomposition of the acidic permanganate solution. The pickling solution of EP 202 57 08 has the disadvantages that it is laborious to prepare and the educts, the manganese(II) salts, are expensive as they have to be free of alkali and earth alkali metal ions. The pickling process and the metallization process including the pickling require additional equipment which renders the processes and the respective process lines even more expensive and laborious.

Although acidic permanganate solutions can be suited for etching plastics surfaces and sufficient adhesion strength between deposited metal layer and plastic substrate may be obtained, acidic permanganate solutions are unstable. When etching the substrate surface, the permanganate ions are reduced and the end-product is manganese dioxide. Manganese dioxide catalyzes the formation of further manganese dioxide and oxygen and leads to self-decomposition of permanganate. Thus, the etching effect of a freshly prepared acidic permanganate solution will be insufficient already after several hours. The acidic permanganate etching solution can be re-sharpened by addition of permanganate which causes a high consumption of the permanganate compounds. In addition, the concentration of manganese dioxide further increases. Moreover, manganese dioxide forms a precipitate that is difficult to remove from the etching solution. As a result of this enrichment the viscosity of the etching solution will be increased up to a point where the etching solution must be discarded, because satisfying etching results cannot be achieved any longer. Further, the precipitate spreads over the entire metallizing process of the plastic surfaces and impairs the metal deposition, so that faulty or other-wise insufficient metal layers are finally deposited. A constant high quality of the metallization therefore cannot be achieved.

OBJECTIVE OF THE PRESENT INVENTION

Therefore, the objective of the present invention is to provide a stable, acidic permanganate solution that is easy to prepare, has a long life and minimizes permanganate consumption.

A further objective was to provide a method for etching electrically nonconductive plastic surfaces having a sufficient etching effect.

Another objective was to provide a method for metallizing electrically nonconductive plastic surfaces of articles with constant high quality of the metallization and sufficient adhesion strength of the metal layer deposited onto the plastic surfaces.

SUMMARY OF THE INVENTION

These objectives are achieved by the following solution and processes.

An etching solution for treating nonconductive plastic surfaces, comprising
  (i) at least one acid,
    wherein the concentration of the at least one acid ranges from 0.02-0.6 mol/l based on a monobasic acid; and (ii) at least one permanganate salt selected from alkali metal permanganates and earth alkali metal permanganates,
wherein the permanganate salt is present in the etching solution in a concentration between 30 g/l and 250 g/l; and
(iii) at least one source for a metal ion, wherein the metal of the metal ion is selected from titanium, zirconium, niobium, molybdenum, ruthenium, rhodium, nickel, copper, silver, zinc and cadmium.

The metal ion according to (iii) stabilizes the etching solution. That means the presence of metal ions according to (iii) prevents the self-decomposition of the acidic etching solution containing alkali metal permanganates and earth alkali metal permanganates.

A process for etching electrically nonconductive plastic surfaces of articles, comprising the process step of:
A) treating the plastic surface with at least one etching solution for treating nonconductive plastic surfaces, the etching solution comprising
(i) at least one acid,
(ii) at least one permanganate salt selected from alkali metal permanganates and earth alkali metal permanganates, and
(iii) at least one source for a metal ion, wherein the metal of the metal ion is selected from titanium, zirconium, niobium, molybdenum, ruthenium, rhodium, nickel, copper, silver, zinc and cadmium.

Using the above described etching solution in an etching process leads to sufficiently etched, electrically nonconductive plastic surfaces.

A process for metallizing electrically nonconductive plastic surfaces of articles, comprising the process steps of:
A) treating the plastic surface with at least one etching solution for treating nonconductive plastic surfaces, the etching solution comprising
(i) at least one acid,
(ii) at least one permanganate salt selected from alkali metal permanganates and earth alkali metal permanganates, and
(iii) at least one source for a metal ion, wherein the metal of the metal ion is selected from titanium, zirconium, niobium, molybdenum, ruthenium, rhodium, nickel, copper, silver, zinc and cadmium, and
B) metallizing the plastic surface with a metallizing solution.

Using the above described etching solution in a metallizing process leads to metal deposits without surface defects and sufficient adhesion strength of the metal layer deposited onto the plastic surfaces.

DETAILED DESCRIPTION OF THE INVENTION

The inventive etching solution comprises at least one acid, at least one permanganate salt selected from alkali metal permanganates and earth alkali metal permanganates, and at least one source for a metal ion according to (iii).

The alkali metal permanganates are selected from the group comprising potassium permanganate, sodium permanganate, lithium permanganate and rubidium permanganate, preferably potassium permanganate and sodium permanganate. The earth alkali metal permanganates are selected from the group comprising magnesium permanganate and calcium permanganate, preferably calcium permanganate. The permanganate salt is present in the etching solution in a concentration between 30 g/l and 250 g/l, preferably between 30 g/l and 180 g/l, more preferably between 90 g/l and 180 g/l. Owing to its solubility, potassium permanganate may be present in the etching solution in a concentration of up to 70 g/l. Sodium permanganate may be present in the etching solution in a concentration of up to 250 g/l. The lower concentration limit for each of these two salts is typically 30 g/l. The content of sodium permanganate is preferably between 90 g/l and 180 g/l.

In a further embodiment of the present invention the concentration of the permanganate salt may be even lower. In this embodiment the concentration of the permanganate salt preferably ranges from 5 g/l to 250 g/l, more preferably from 10 g/l to 180 g/l, most preferably from 15 g/l to 150 g/l.

The etching solution is acidic, meaning that it contains at least one acid according to (i). Acids which are used in the etching solution are preferably inorganic acids. The inorganic acid in the etching solution is selected from the group comprising sulphuric acid, nitric acid and phosphoric acid. The acid concentration is low as this contributes further to the stability of the etching solution. The acid concentration is between 0.02-0.6 mol/l based on a monobasic acid. It is preferably between 0.06 and 0.45 mol/l, more preferably between 0.07 and 0.30 mol/l, based in each case on a monobasic acid. Preference is given to using sulphuric acid in a concentration between 0.035 and 0.15 mol/l, corresponding to an acid concentration between 0.07 and 0.30 mol/l based on a monobasic acid. The permanganate salt and the acid of the etching solution of the present invention contribute to the stability of the etching solution if contained in the concentration ranges specified above. An acidic permanganate solution is very reactive. The oxidation reaction with the plastic surface then forms many manganese(IV) species which precipitate out. These manganese(IV) species are predominantly manganese(IV) oxides or oxide hydrates and are referred to hereinafter simply as manganese dioxide. The manganese dioxide precipitate has a disruptive effect on the subsequent metallization if it remains on the plastic surface.

The manganese dioxide also catalyses the reaction of permanganate with water according to formula (2) and thus leads to instability of an etching solution.

$$4MnO_4^- + 2H_2O \rightarrow 4MnO_2 + 3O_2 + 4OH^- \qquad \text{Formula (2):}$$

Etching solutions should therefore advantageously be kept free of manganese dioxide. It has been found that, surprisingly, the formation of manganese dioxide species which are difficult to remove is noticeably decreased when metal ions according to (iii) are present in an acidic permanganate etching solution.

The metal of the metal ion according to (iii) is selected from titanium, zirconium, niobium, molybdenum, ruthenium, rhodium, nickel, copper, silver, zinc and cadmium. Preferably, the metal may be selected from copper, nickel, and zinc. More preferably, the metal may be selected from copper.

The at least one source for a metal ion according to (iii) is selected from water soluble salts of the above listed metals of the metal ion according to (iii). Preferably, the at least one source for a metal ion is selected from water soluble sulphate, phosphate, nitrate and permanganate salts of the above listed metals of the metal ion. More preferably, the at least one source for a metal ion is selected from copper sulfate, copper phosphate, copper nitrate, copper permanganate, silver nitrate, zinc sulphate, zinc nitrate, zinc permanganate, cadmium sulphate, cadmium nitrate, titanium sulfate, titanium nitrate, zirconium sulfate, nickel sulfate, nickel nitrate, rhodium sulphate and the hydrates thereof. Most preferably, the at least one source for a metal ion is selected from copper sulfate, copper phosphate, copper nitrate, copper permanganate and the hydrates thereof. The concentration of the metal ion according to (iii) ranges from 1 mmol/l to 1 mol/l, preferably from 10 mmol/l to 1 mol/l, more preferably from 10 mmol/l to 100 mmol/l, most preferably 30 mmol/l to 100 mmol/l.

In a further embodiment of the present invention the concentration of the metal ion according to (iii) ranges preferably from 1 mmol/l to 90 mmol/l, more preferably from 1 mmol/l to 80 mmol/l.

The molar ratio of permanganate ions according to (ii) to metal ions according to (iii) ranges from 5:1 to 40:1, preferably from 10:1 to 20:1.

The steps in the processes of the present invention are performed in the sequence specified, but not necessarily in immediate succession. It is possible for further process steps and additionally rinse steps in each case, preferably with water, to be performed between the steps.

The inventive process for etching electrically nonconductive plastic surfaces of articles, comprises the process step of:
A) treating the plastic surface with at least one etching solution for treating nonconductive plastic surfaces, the etching solution comprising
  (i) at least one acid,
  (ii) at least one permanganate salt selected from alkali metal permanganates and earth alkali metal permanganates, and
  (iii) at least one source for a metal ion, wherein the metal of the metal ion is selected from titanium, zirconium, niobium, molybdenum, ruthenium, rhodium, nickel, copper, silver, zinc and cadmium.

The etching solution can be employed at temperatures between 30° C. and 90° C., preferably between 55° C. and 75° C., most preferably between 65° C. and 72° C.

The optimal treatment time depends on the plastic surface being treated and the selected temperature of the etching solution. For ABS and ABS/PC plastic surfaces, the best adhesion strength between plastic surface and subsequently applied metal layer is achieved at a treatment time between 5 and 30 minutes, preferably between 10 and 25 minutes and more preferably between 10 and 15 minutes. A longer treatment time than 30 minutes generally leads to no further improvement in the adhesion strengths.

The electrically nonconductive plastic surfaces have been manufactured from at least one electrically nonconductive plastic. In one embodiment of the present invention, the at least one electrically nonconductive plastic is selected from the group comprising an acrylonitrile-butadiene-styrene copolymer (ABS copolymer), a polyamide (PA), a polycarbonate (PC) and a mixture of an ABS copolymer with at least one further polymer.

In a preferred embodiment of the invention, the electrically nonconductive plastic is an ABS copolymer or a mixture of an ABS copolymer with at least one further polymer. The at least one further polymer is more preferably polycarbonate (PC), which means that particular preference is given to ABS/PC mixtures.

The inventive process for metallizing electrically nonconductive plastic surfaces of articles, comprises the process steps of:
A) treating the plastic surface with at least the etching solution for treating nonconductive plastic surfaces, the etching solution comprising
  (i) at least one acid,
  (ii) at least one permanganate salt selected from alkali metal permanganates and earth alkali metal permanganates, and
  (iii) at least one source for a metal ion, wherein the metal of the metal ion is selected from titanium, zirconium, niobium, molybdenum, ruthenium, rhodium, nickel, copper, silver, zinc and cadmium, and
B) metallizing the plastic surface with a metallizing solution.

Process step A) is performed as described for the process for etching electrically nonconductive plastic surfaces above.

In a preferred embodiment of the invention, process step A) is preceded by performance of the following further process step:
pretreatment step: treating the plastic surface in an aqueous solution comprising at least one glycol compound.

This further process step is referred to hereinafter as pretreatment step. This pretreatment step increases the adhesion strength between the plastic and the metal layer.

A glycol compound is understood to mean compounds of the following general formula (I):

wherein
n is an integer from 1 to 4; and
R1 and R2 are each independently —H, —CH3, —CH2-CH3, —CH2-CH2-CH3, —CH(CH3)-CH3, —CH2-CH2-CH2-CH3, —CH(CH3)-CH2-CH3, —CH2-CH(CH3)-CH3, —CH2-CH2-CH2-CH2-CH3, —CH(CH3)-CH2-CH2-CH3, —CH2-CH(CH3)-CH2-CH3, —CH2-CH2-CH(CH3)-CH3, —CH(CH2-CH3)-CH2-CH3, —CH2-CH(CH2-CH3)-CH3, —CO—CH3, —CO—CH2-CH3, —CO—CH2-CH2-CH3, —CO—CH(CH3)-CH3, —CO—CH(CH3)-CH2-CH3, —CO—CH2-CH(CH3)-CH3, —CO—CH2-CH2-CH2-CH3.

According to the general formula (I), the glycol compounds include the glycols themselves and glycol derivatives. The glycol derivatives include the glycol ethers, the glycol esters and the glycol ether esters. The glycol compounds are solvents.

Preferred glycol compounds are ethylene glycol, diethylene glycol, ethylene glycol monomethyl ether acetate, ethylene glycol monoethyl ether acetate, ethylene glycol monopropyl ether acetate, ethylene glycol acetate, diethylene glycol monoethyl ether acetate, diethylene glycol monomethyl ether acetate, diethylene glycol monopropyl ether acetate, butyl glycol, ethylene glycol monobutyl ether, ethylene glycol diacetate and mixtures thereof. Particular preference is given to diethylene glycol monoethyl ether acetate, ethylene glycol acetate, ethylene glycol diacetate, butyl glycol and mixtures thereof.

In the case of use of glycol esters and glycol ether esters, it is advisable to keep the pH of the aqueous solution of the glycol compound within the neutral range by suitable measures, in order to as far as possible suppress the hydrolysis to give the alcohol and carboxylic acid. One example is the hydrolysis of the diethylene glycol monoethyl ether acetate:

The solution of a glycol ester or glycol ether ester contains a pH buffering agent thus to keep it within the neutral pH range, which means scavenging the protons obtained by hydrolysis of the solvent. A phosphate buffer mixture has been found to be sufficiently suitable for this purpose. The readily soluble potassium phosphates allow sufficiently high concentrations with good buffer capacity at solvent concentrations up to 40% by vol.

The optimal treatment time for the plastic surface depends on the plastic used, the temperature, and the nature and concentration of the glycol compound. Treating the plastic surface in an aqueous solution comprising at least one glycol compound contributes to the adhesion strength of the subsequently deposited metal layer. The treatment time in the pretreatment step is between 1 and 30 minutes, preferably between 5 and 20 minutes and more preferably between 7 and 15 minutes.

The treatment temperature is between 20° C. and 70° C., depending on the nature of the solvent or solvent mixture used. Preference is given to a treatment temperature between 20° C. and 50° C., particular preference to a treatment temperature between 20° C. and 45° C.

The treatment of the plastic surfaces in the pretreatment step can be performed in an aqueous solution comprising one glycol compound or in an aqueous solution comprising two or more different glycol compounds. The total concentration of glycol compounds in the aqueous solution is 5% by vol.-50% by vol., preferably 10% by vol.-40% by vol. and more preferably 20% by vol.-40% by vol. If said solution contains one glycol compound, the overall concentration corresponds to the concentration of this one glycol compound. If said solution contains two or more different glycol compounds, the total concentration corresponds to the sum total of the concentrations of all glycol compounds present. In the context of the solution containing at least one glycol compound, the concentration figures for the glycol compound/glycol compounds in % are always understood to mean a concentration in % by vol.

In a preferred embodiment of the invention, following further process step is performed after process step A):

A i) treating the plastic surface with an alkaline etching solution.

Process step A i) may be performed in the process for etching electrically nonconductive plastic surfaces of articles and/or in the process for metallizing electrically nonconductive plastic surfaces of articles. If the process for metallizing electrically nonconductive plastic surfaces is performed including process step B), process step A i) is preferably performed after process step A) and prior to process step B). Preferably, process step A i) is performed between process steps A) and B).

The alkaline etching solution comprises:
1. at least one permanganate salt selected from alkali metal permanganates and earth alkali metal permanganates and
2. a hydroxide ion source.

The permanganate salts of the alkaline etching solution are selected from the same permanganate salts as listed for the acidic etching solution; these are the permanganate salts according to (ii). The permanganate salt is selected independently for the alkaline and acidic etching solutions, meaning that the two etching solutions may contain the same permanganate salt or the two etching solutions may contain different permanganate salts.

The permanganate salt is present in alkaline etching solution in a concentration as given above for the acidic etching solution. The concentration of the permanganate salt for the alkaline and acidic etching solutions is selected independently, meaning that the two etching solutions may contain the same concentration of permanganate salt or the two etching solutions may contain different concentrations of permanganate salts.

The hydroxide ion source in the alkaline etching solution is selected from the group of alkali metal hydroxides comprising sodium hydroxide, potassium hydroxide and lithium hydroxide. The hydroxide ion source is preferably sodium hydroxide. The hydroxide ion source in the alkaline etching solution is selected independently of the metal permanganate, meaning that the alkaline etching solution may comprise a hydroxide ion source and metal permanganate with the same alkali metal ion, or the alkaline etching solution may comprise a hydroxide ion source and metal permanganate with different alkali metal ions.

The concentration of the hydroxide ion source is between 1 g/l and 100 g/l, preferably between 5 g/l and 50 g/l and more preferably between 10 g/l and 30 g/l.

The alkaline etching solution can be employed at temperatures between 20° C. and 90° C., preferably between 30° C. and 75° C. and more preferably between 30° C. and 60° C. The treatment of the plastic surfaces with alkaline etching solution within the temperature range between 30° C. and 60° C. leads to higher adhesion strengths. The stability of the alkaline permanganate solution falls somewhat at elevated temperatures. In general, however, the alkaline permanganate solution is much more stable than the acidic permanganate solution. The stability of the alkaline permanganate solution is uncritical within the range between 40° C. and 60° C.

The optimal treatment time with the alkaline etching solution likewise depends on the plastic surface being treated and the selected temperature of an etching solution. Treatment time with the alkaline etching solution ranges between 1 and 20 minutes, preferably between 1 and 15 minutes and more preferably between 1 and 5 minutes. A longer treatment time than 20 minutes generally does not lead to any further improvement in the adhesion strengths.

In a preferred embodiment of the invention, following further process step is performed after process step A):

A ii) treating the plastic surface in a solution comprising a reducing agent for manganese dioxide.

The further process step A ii) is also referred to as reduction treatment. This reduction treatment reduces manganese dioxide adhering to the plastic surfaces to water-soluble manganese(II) ions. The reduction treatment is conducted optionally after A i). Process step A ii) may be performed in the process for etching electrically nonconductive plastic surfaces of articles and/or in the process for metallizing electrically nonconductive plastic surfaces of articles. If the process for metallizing electrically nonconductive plastic surfaces is performed including process step B), process step A ii) is preferably performed after process step A) and prior to process step B); more preferably after process step A i) and prior to process step B). Preferably, process step A ii) is performed between process steps A) and B).

For this purpose, an acidic solution of a reducing agent is used. The reducing agent is selected from the group comprising hydroxylammonium sulphate, hydroxylammonium chloride and hydrogen peroxide. Preference is given to an acidic solution of hydrogen peroxide because hydrogen peroxide is neither toxic nor complex-forming. The content of hydrogen peroxide in the solution of the reduction treatment (reduction solution) is between 25 ml/l and 35 ml/l of a 30% hydrogen peroxide solution (% by weight), preferably 30 ml/l of a 30% hydrogen peroxide solution (% by weight).

The acid used in the reduction solution is an inorganic acid, preferably sulphuric acid. The acid concentration is 0.5 mol/l to 5.0 mol/l, preferably 1.0 mol/l to 3.0 mol/l, more preferably 1.0 mol/l to 2.0 mol/l, based in each case on a monobasic acid. In the case of use of sulphuric acid, particular preference is given to concentrations of 50 g/l 96% sulphuric acid to 100 g/l 96% sulphuric acid, corresponding to an acid concentration of 1.0 mol/l to 2.0 mol/l based on a monobasic acid.

The reduction treatment in process step A ii) is performed at a temperature between 30° C. and 50° C., preferably at 40° C. to 45° C. The reduction treatment is performed for a period between 0.5 and 10 minutes, preferably between 1 and 6 minutes, more preferably between 3 and 6 minutes. In order to achieve sufficient protection of the racks prior to activation, it is advantageous to increase the treatment time in the reduction solution to 3 to 10 minutes, preferably to 3 to 6 minutes.

In a preferred embodiment of the invention, the etched plastics surface is metallized by electroless metal plating.

In this embodiment the process of the present invention further comprises process step A iii), in which a plastic surface is treated with a solution of a metal colloid or of a compound of a metal.

The metal of the metal colloid or of the metal compound is selected from the group comprising the metals of transition group I of the Periodic Table of the Elements (PTE) and transition group VIII of the PTE.

The metal of transition group VIII of the PTE is selected from the group comprising palladium, platinum, iridium, rhodium and a mixture of two or more of these metals. The metal of transition group I of the PTE is selected from the group comprising gold, silver and a mixture of these metals.

A preferred metal in the metal colloid is palladium. The metal colloid is stabilized with the protective colloid. The protective colloid is selected from the group comprising metallic protective colloids, organic protective colloids and other protective colloids. As a metallic protective colloid, preference is given to tin ions. The organic protective colloid is selected from the group comprising polyvinyl alcohol, polyvinylpyrrolidone and gelatine, preferably polyvinyl alcohol.

In a preferred embodiment of the invention, the solution of the metal colloid in process step A iii) is an activator solution with a palladium/tin colloid. This colloid solution is obtained from a palladium salt, a tin(II) salt and an inorganic acid. A preferred palladium salt is palladium chloride. A preferred tin(II) salt is tin(II) chloride. The inorganic acid may consist in hydrochloric acid or sulphuric acid, preferably hydrochloric acid. The colloid solution forms through reduction of the palladium chloride to palladium with the aid of the tin(II) chloride. The conversion of the palladium chloride to the colloid is complete; therefore, the colloid solution no longer contains any palladium chloride.

If, in the subsequent process steps, the plastic surfaces are metallized electrolessly, the concentration of palladium in the colloid solution is 5 mg/l-100 mg/l, preferably 20 mg/l-50 mg/l and more preferably 30 mg/l-45 mg/l, based on $Pd^{2+}$.

If the plastic surfaces in the subsequent process steps are metallized by means of direct electroplating, the concentration of palladium in the colloid solution is 50 mg/l-200 mg/l, preferably 75 mg/l-150 mg/l, more preferably 100 mg/l-150 mg/l, and more preferably 80 mg/l-120 mg/l, based on $Pd^{2+}$.

The concentration of tin(II) chloride is 0.5 g/l-10 g/l, preferably 1 g/l-5 g/l and more preferably 2 g/l-4 g/l, based on $Sn^{2+}$. The concentration of hydrochloric acid is 100 ml/l-300 ml/l (37% by weight of HCl). In addition, a palladium/tin colloid solution additionally comprises tin(IV) ions which form through oxidation of the tin(II) ions. The temperature of the colloid solution during process step B) is 20° C.-50° C. and preferably 35° C.-45° C. The treatment time with the activator solution is 0.5 min-10 min, preferably 2 min-5 min and more preferably 3 min-5 min.

In a further embodiment of the invention, in process step A iii), the solution of a compound of a metal is used in place of the metal colloid. The solution of a metal compound used is a solution comprising an acid and a metal salt. The metal in the metal salt consists in one or more of the above-listed metals of transition groups I and VIII of the PTE. The metal salt may be a palladium salt, preferably palladium chloride, palladium sulphate or palladium acetate, or a silver salt, preferably silver acetate. The acid is preferably hydrochloric acid. Alternatively, it is also possible to use a metal complex, for example a palladium complex salt, such as a salt of a palladium-aminopyridine complex. The metal compound in process step A iii) is present in a concentration of 40 mg/l to 80 mg/l, based on the metal. The solution of the metal compound can be employed at a temperature of 25° C. to 70° C., preferably at 25° C. The treatment time with the solution of a metal compound is 0.5 min-10 min, preferably 2 min-6 min and more preferably 3 min-5 min.

Prior to process step Aiii), the following further process step can be performed:
Rack protection: treating the plastic surface with a solution comprising iodate ions.

The rack protection step leads to protection of the plastic casing of the racks against metal deposition while the plastic articles which are fastened to the racks are being metallized.

The protection of the rack is executed at a temperature of 20° C. to 70° C., more preferably of 45° C. to 55° C. The iodate ions are in the form of metal iodates. The metal iodates are selected from the group comprising sodium iodate, potassium iodate, magnesium iodate, calcium iodate and the hydrates thereof. The concentration of the metal iodates is between 5 g/l and 50 g/l, preferably from 15 g/l to 25 g/l. The duration of the treatment of the rack with iodate ions is between 1 and 20 minutes, preferably between 2 and 15 minutes and more preferably between 5 and 10 minutes.

The solution comprising iodate ions may further comprise an acid. Inorganic acids are preferred. The inorganic acids are selected from the group comprising sulphuric acid and phosphoric acid, preferably sulphuric acid. The acid concentration is 0.02 mol/l to 2.0 mol/l, preferably 0.06 mol/l to 1.5 mol/l, more preferably 0.1 mol/l to 1.0 mol/l, based in each case on a monobasic acid. In the case of use of sulphuric acid, particular preference is given to concentrations of 5 g/l 96% sulphuric acid to 50 g/l 96% sulphuric acid, corresponding to an acid concentration of 0.1 mol/l to 1.0 mol/l based on a monobasic acid.

Between process steps A ii) and Aiii), the following further process step can be performed:
preliminary dipping: treating the plastic surface in an aqueous acidic solution.

The aqueous acidic solution used in the preliminary dipping step is referred to as a preliminary dipping solution. The preliminary dipping solution has the same composition as the colloid solution in process step B), without the presence of the metal in the colloid and the protective colloid thereof. The preliminary dipping solution, in the case of use of a palladium/tin colloid solution in process step A iii), comprises exclusively hydrochloric acid if the colloid solution likewise comprises hydrochloric acid. For preliminary dipping, brief immersion into the preliminary dipping solution at ambient temperature is sufficient. Without rinsing the plastic surfaces, they are treated further directly with the colloid solution of process step B) after the treatment in the preliminary dipping solution.

The preliminary dipping step is preferably performed when process step A iii) involves the treatment of a plastic surface with a solution of a metal colloid. The preliminary dipping step can also be performed when process step A iii) involves the treatment of a plastic surface with a solution of a compound of a metal.

In the embodiment including electroless metal plating, the following further process steps may be performed between process steps A iii) and B):
A iv) treating the plastic surface in an aqueous acidic solution and
A v) electrolessly metallizing the plastic surface in a metallizing solution.

These further process steps A iv) and A v) are employed when the articles are to be metallized by an electroless metallization process, i.e. a first metal layer is to be applied to the plastic surfaces by an electroless process.

If the activation in process step A iii) has been performed with a metal colloid, the plastic surfaces are treated in process step A iv) with an accelerator solution in order to remove constituents of the colloid in the colloid solution, for example a protective colloid, from the plastic surfaces. If the colloid in the colloid solution in process step A iii) is a palladium/tin colloid, the accelerator solution used is preferably an aqueous solution of an acid. The acid is selected, for example, from the group comprising sulphuric acid, hydrochloric acid, citric acid and tetrafluoroboric acid. In the case of a palladium/tin colloid, the accelerator solution helps to remove the tin compounds which served as the protective colloid.

Alternatively, in process step A iv), a reductor treatment is performed when, in process step A iii), a solution of a metal compound has been used in place of a metal colloid for the activation. The reductor solution used for this purpose then comprises, if the solution of the metal compound was a hydrochloric acid solution of palladium chloride or an acidic solution of a silver salt, hydrochloric acid and tin(II) chloride. The reductor solution may also comprise another reducing agent, such as $NaH_2PO_2$ or else a borane or borohydride, such as an alkali metal borane or alkaline earth metal borane or dimethylaminoborane. Preference is given to using $NaH_2PO_2$ in the reductor solution.

Process step A iv) and optionally one or more rinse steps are followed by process step A v) in which the plastic surfaces are metallized electrolessly. Electroless nickel-plating is accomplished, for example, using a conventional nickel bath which comprises, inter alia, nickel sulphate, a hypophosphite, for example sodium hypophosphite, as a reducing agent, and also organic complexing agents and pH adjusters (for example a buffer). The reducing agent used may likewise be dimethylaminoborane or a mixture of hypophosphite and dimethylaminoborane.

Alternatively, it is possible to use an electroless copper bath for electroless copper-plating, the electroless copper bath typically comprising a copper salt, for example copper sulphate or copper hypophosphite, and also a reducing agent, such as formaldehyde or a hypophosphite salt, for example an alkali metal or ammonium salt, or hypophosphorous acid, and additionally one or more complexing agents such as tartaric acid, and also a pH adjuster such as sodium hydroxide.

The surface thus rendered conductive can subsequently be electrolytically further metallized in order to obtain a functional or decorative surface.

In a further embodiment of the invention, the plastic surfaces are metallized by means of direct electroplating, meaning that the plastic surfaces are metallized not electrolessly but directly by an electrolytic metallization process. In this embodiment, the following further process step is performed between process steps A) and B):
A iv) treating the plastic surfaces in a conversion solution.

Preferably process step A iv) is performed between process steps A iii) and B). This step A iv) is an alternative process step. It replaces steps A iv) and A v) of the embodiment in which the etched plastics surface is metallized by electroless metal plating. The remaining process steps are identical for the embodiment concerning electroless metal plating and for the embodiment concerning direct electroplating.

The effect of the treatment of the plastic surfaces in a conversion solution is that an electrically conductive layer sufficient for a direct electrolytic metallization is formed on the plastic surfaces without prior electroless metallization. If the colloid in the colloid solution in process step A iii) is a palladium/tin colloid, the conversion solution used is preferably an alkaline solution of copper ions complexed by a complexing agent. For example, the conversion solution may comprise an organic complexing agent, such as tartaric acid, ethylenediaminetetraacetic acid (EDTA) or ethanolamine and/or a salt thereof, and a copper salt, such as copper sulphate.

The conversion solution may comprise (a) a soluble metal salt, (b) a group IA metal hydroxide, and (c) a complexing agent for an ion of the metal of the soluble metal salt according to (a). The metal of the soluble metal salt according to (a) may be selected from the group comprising Cu, Ag, Au, Ni and mixtures thereof. The soluble metal salt according to (a) may be selected from the group comprising Ag(I), Ag(II), Au(I), Au(II), Ni(II) and Cu(II) salts. Preferably, the soluble metal salt according to (a) may be a Cu(II) salt. The soluble metal salt according to (a) may be present in the conversion solution in a concentration ranging from 0.2 mmol/l to 200 mmol/l, preferably from 1 mmol/l to 100 mmol/l, more preferably from 5 mmol/l to 20 mmol/l.

The metal of the group IA metal hydroxide according to (b) may be selected from the group comprising Li, Na, K, Rb, Cs and mixtures thereof, preferably Li, Na, K and mixtures thereof. The group IA metal hydroxide according to (b) may be present in the conversion solution in a concentration ranging from 0.05 mol/l to 5 mol/l, preferably from 0.1 mol/l to 3 mol/l, more preferably from 0.5 mol/l to 2 mol/l.

The complexing agent according to (c) may be selected from the group comprising mono and poly carboxylic acids, like tartaric acid, gluconic acid, lactic acid, acetic acid, succinic acid; chelating agents, like ethylenediaminetetraacetic acid (EDTA); alkanolamines, like ethanolamine; iminosuccinic acid and/or derivatives thereof; salts of the aforementioned; and mixtures thereof. The complexing agent according to (c) may be present in the conversion solution in a concentration ranging from 5 mmol/l to 5 mol/l, preferably from 50 mmol/l to 3 mol/l, more preferably from 100 mmol/l to 2 mol/.

Preferably, the conversion solution is an alkaline solution. More preferably, the pH value of the conversion solution ranges from 8 to 15, even more preferably from 10 to 15 and most preferably from 12 to 15.

The temperature of the conversion solution may range from 40° C. to 80° C., preferably from 45° C. to 70° C., when treating the nonconductive plastic surfaces. The treatment time may range from 1 minute to 20 minutes, preferably from 2 minutes to 10 minutes.

The plastic surface which has thus been rendered conductive can subsequently be further metallized electrolytically, in order to obtain a functional or decorative surface.

In another preferred embodiment of the invention, the plastic surfaces are metallized also by means of direct electroplating. In this embodiment, the following alternative process step is performed between process steps A) and B):

A iv) treating the plastic surfaces in a sulfide containing solution.

Preferably, alternative process step A iv) is performed after process steps A) or A i). This alternative process step A iv) replaces step A iv) of the embodiment in which the etched plastics surface is metallized by direct electroplating via treatment with a conversion solution and alternative process step A iv) replaces steps A iv) and A v) of the embodiment in which the etched plastics surface is metallized by electroless metal plating. Surprisingly, this treatment generates a metal sulfide layer on the plastic surfaces that is sufficiently electrically conductive to enable direct electroplating afterwards. The metal of the generated metal sulfide originates from the etching solution containing a source for metal ion according to (iii) applied to the plastic surface in process step A). If, for example, an etching solution containing 10 g/l copper sulfate is used in process step A), the substrate surface is covered with a manganese dioxide layer containing an amount of about 0.7 $g/m^2$ manganese. This manganese dioxide layer contains copper ions in an amount of about 100 $mg/m^2$ copper ions. This amount of copper is sufficient to enable direct electroplating in subsequent process step B).

The plastic surface which has thus been rendered conductive can subsequently be further metallized electrolytically, in order to obtain a functional or decorative surface.

Thus, in this embodiment it is possible to metallize a nonconductive plastic surface by performing only three method steps:

A) treating the plastic surface with the at least one acidic etching solution containing metal ions according to (iii) as described above,
A iv) treating the plastic surfaces in a sulfide containing solution, and
B) metallizing the plastic surface by direct electroplating.

All further process steps described above are not necessary. In addition, the deposited metal layer is of good quality and has good adhesion strength. Thus, the acidic permanganate etching solution containing metal ions according to (iii) is not only excellently stable. It also provides good etching of plastic surfaces which leads to good adhesion strength of metal layers deposited thereon. It further enables direct metallizing of plastic surfaces in only three process steps.

The source for sulfide in the sulfide containing solution is selected from alkali metal sulfides, earth alkali metal sulfides and ammonium sulfides. The sulfide may be a monosulfide, disulfide, tetrasulfide or a polysulfide. Preferably the source for sulfide in the sulfide containing solution is selected from sodium monosulfide, sodium disulphide, potassium monosulfide and potassium disulphide. The concentration of the source for sulphide ranges from 0.5 to 50 g/l, preferably from 0.5 to 10 g/l, more preferably from 2 to 8 g/l.

The sulfide containing solution may further be an alkaline solution. The pH value of the sulfide containing solution ranges from 8 to 12, preferably from 9 to 11. Thus the sulfide containing solution comprises a source for hydroxide ions. The source for hydroxide ions in the sulfide containing solution is selected from alkali metal hydroxides, earth alkali metal hydroxides and ammonium hydroxide. Preferably the source for hydroxide ions is selected from sodium hydroxide and potassium hydroxide. The concentration of the source for hydroxide ions ranges from 1 to 25 g/l, preferably from 5 to 10 g/l.

The treatment with the sulfide solution is performed for a time ranging from 1 minute to 10 minutes, preferably from 2 to 7 minutes. The treatment with the sulfide solution is performed at a temperature ranging from 20 to 60° C., preferably from 30 to 50° C.

The treatment with the sulfide containing solution has two effects. It reduces the manganese dioxide deposited on the surface of the plastic substrate during process step A). Thus, it removes the manganese dioxide and thereby contributes to the adhesion strength of the subsequently deposited metal layer. In addition, the sulfide containing solution forms an electrically conductive metal sulfide layer with the metal ions according to (iii) originating from the inventive etching solution. Surprisingly, the metal ions according to (iii) are not removed by the sulfide containing solution together with the manganese dioxide although the metal ions are contained within the manganese dioxide layer. Surprisingly, a sufficient amount of metal ions according to (iii) remains on the surface of the plastic substrate to generate a metal sulfide layer with an electrical conductivity sufficient for subsequent direct electroplating.

In this embodiment, the pretreatment step may be performed prior to process step A): pretreatment step: treating the plastic surface in an aqueous solution comprising at least one glycol compound.

This process step is already described above and is performed as described above. This process step is an optional process step; it is not essential for rendering the plastic surface sufficiently conductive to enable direct electroplating.

In this embodiment, the process step A i) may be performed after process step A):

A i) treating the plastic surface with an alkaline etching solution.

This process step is already described above and is performed as described above. Preferably, optional process step A i) is performed between process step A) and process step B), more preferably between process step A) and process step A iv). If alternative process step A iii) is performed, optional process step A i) is preferably performed between process step A) and alternative process step A iii). Process step A i) is an optional process step; it is not essential for rendering the plastic surface sufficiently conductive to enable direct electroplating. But if performed, optional process step A i) contributes to improving the adhesion strength of the metal layer subsequently deposited onto the nonconductive plastic surface.

In this embodiment, the following alternative process step may be performed between process steps A) and B):

A iii) treating the plastic surface in a solution containing a source for metal ions.

This alternative process step A iii) replaces step A iii) of the embodiment in which the etched plastics surface is metallized by direct electroplating via treatment with a conversion solution and alternative process step A iii) replaces step A iii) of the embodiment in which the etched plastics surface is metallized by electroless metal plating.

The metal of the metal ion according to A iii) is selected from titanium, zirconium, vanadium, niobium, chromium, molybdenum, ruthenium, cobalt, rhodium, nickel, palladium, copper, silver, zinc, bismuth and cadmium. Preferably, the metal is selected from titanium, zirconium, vanadium, niobium, chromium, molybdenum, ruthenium, cobalt, rhodium, nickel, palladium, copper, silver, zinc and cadmium. More preferably, the metal is selected from copper, nickel, zinc, chromium and cobalt. Even more preferably, the metal is copper.

The at least one source for a metal ion according to A iii) is selected from water soluble salts of the above listed metals of the metal ion according to A iii). Preferably, the at least one source for a metal ion is selected from water soluble sulphate, phosphate, nitrate and permanganate salts of the above listed metals of the metal ion. More preferably, the at least one source for a metal ion is selected from copper sulfate, copper phosphate, copper nitrate, copper permanganate, silver nitrate, zinc sulphate, zinc nitrate, zinc permanganate, cadmium sulphate, cadmium nitrate, titanium sulfate, titanium nitrate, zirconium sulfate, vanadyl sulfate, chromium trioxide, chromium(III) trisulfate, chromium(II) sulfate, chromium nitrate, cobalt sulphate, cobalt nitrate, nickel sulfate, nickel nitrate, rhodium sulphate and the hydrates thereof. Most preferably, the at least one source for a metal ion is selected from copper sulfate, copper phosphate, copper nitrate, copper permanganate and the hydrates thereof. The concentration of the metal ion according to A iii) ranges from 1 mmol/l to 1 mol/l, preferably from 10 mmol/l to 1 mol/l, more preferably from 10 mmol/l to 100 mmol/l, most preferably 30 mmol/l to 100 mmol/l.

The solution containing a source for metal ions according to A iii) can be employed at temperatures ranging from 20 to 60° C., preferably from 30 to 50° C. The treatment with the solution containing a source for metal ions according to A iii) is performed for a time ranging from 1 minute to 10 minutes, preferably from 2 to 7 minutes.

The solution containing a source for metal ions according to A iii) may be an alkaline solution. The pH value may range from 7.5 to 12.5, preferably from 8 to 12. pH adjusting agents are selected from ammonia and/or amine. Amines may be monoethanolamine and/or triethanolamine.

This alternative process step A iii) is an optional process step; it is not essential for rendering the plastic surface sufficiently conductive to enable direct electroplating.

For industrial scale application of metallization of plastic surfaces, the articles are usually fastened to racks. These are metallic carrier systems which allow the simultaneous treatment of a large number of articles with the successive solutions for the individual process steps, and last steps for electrolytic deposition of one or more metal layers. The racks are generally themselves coated with plastic, e.g. poly vinyl chloride (PVC). Therefore, the racks in principle likewise constitute a substrate for metallization processes on plastic surfaces. However, the additional metallization of the racks is undesirable, since the metal layers have to be removed again from the racks after the coating of the articles. This means additional cost and inconvenience for the removal, combined with additional consumption of chemicals. Moreover, the productivity of the metallization plant in this case is lower, since the racks first have to be demetallized prior to reloading with articles. If the demetallization has to take place using semi-concentrated hydrochloric acid and/or using nitric acid, vapours and aerosols are produced, and these lead to corrosion in the environment. A further problem is that, when rack metallization occurs, it is no longer possible to achieve a defined current density in a reproducible manner because the extent of the rack coverage is usually unknown, and the exact surface area of the rack is likewise unknown. The consequence is then usually that the metal layer applied to the galvanized plastic articles is too thin.

In a further embodiment of the invention, rack metallization can be prevented by slipping stripes of a plastic material that is not etched by the inventive etching solution over the plastic coat of the rack. Preferably, in the embodiment of the invention, containing the process step of treating the plastic surfaces in a sulfide containing solution, rack metallization can be prevented by slipping stripes of a plastic material that is not etched by the inventive etching solution over the plastic coat of the rack. Preventing rack metallization by this process step is of particular advantage for the the embodiment containing the process step of treating the plastic surfaces in a sulfide containing solution.

Plastic material not being etched by the inventive etching solution is selected from polytetrafluoroethylene (PTFE), polyvinylidene difluoride (PVDF), copolymers of hexafluoropropylene (HFP) and vinylidene fluoride (VDF or VF2), terpolymers of tetrafluoroethylene (TFE), vinylidene fluoride (VDF) and hexafluoropropylene (HFP) or perfluoromethylvinylether (PMVE) containing elastomers. Further examples of plastic material not being etched by the inventive etching solution are terpolymers of TFE, VDF and propylene; as well as fluoroelastomers composed of VDF, HFP, TFE, PMVE, and Ethylene. Preferably, the plastic material not being etched by the inventive etching solution may be a heat shrinkable plastic material. Preferably, the stripes of a plastic material not being etched by the inventive etching solution may also have the form of a shrinkable tubing, preferably a heat shrinkable tubing.

Stripes of the plastic material not being etched by the inventive etching solution are slipped over the plastic coat in positions of the rack where an electrically conductive layer of metal sulfide would lead to rack metallization. Preferably, these positions are in the very near of the electrical contacts of the rack. The stripes of the plastic material not being etched by the inventive etching solution are not covered with an electrically conductive metal sulfide layer. Therefore they interrupt the electrical contact to the conductive metal sulfide layer coated over the parts of original plastic coat of the rack and thus prevent metallization of the rack during direct electroplating.

Accordingly, the process step of slipping stripes of a plastic material not being etched by the inventive etching solution over the plastic coat of the rack may be performed prior to process step A), preferably prior to the pretreatment step.

Step B) of the process according to the invention is the metallization of the plastic surface with a metallization solution. The metallization in process step B) can be effected electrolytically. For electrolytic metallization, it is possible to use any desired metal deposition baths, for example for deposition of nickel, copper, silver, gold, tin, zinc, iron, lead or alloys thereof. Such deposition baths are familiar to those skilled in the art. A Watts nickel bath is typically used as a bright nickel bath, this comprising nickel sulphate, nickel chloride and boric acid, and also saccharine as an additive. An example of a composition used as a bright copper bath is one comprising copper sulphate, sulphuric acid, sodium chloride and organic sulphur compounds in which the sulphur is in a low oxidation state, for example organic sulphides or disulphides, as additives. In particular, electrodeposition bath compositions being weakly acidic to alkaline are suited for the embodiment of the invention containing the process step of treating the plastic surfaces in a sulfide containing solution. The pH value of electrodeposition baths suited for this embodiment ranges from 3 to 10.

The effect of the metallization of the plastic surface in process step B) is that the plastic surface is coated with metal, the metal being selected from the above-listed metals for the deposition baths.

In a further embodiment of the invention, after process step B), the following further process step is performed:

B i) storage of the metallized plastic surface at elevated temperature.

As in all electroplating processes in which a nonconductor is coated by wet-chemical means with a metal, the adhesion strength between metal and plastic substrate increases in the first period after the application of the metal layer. At room temperature, this process is complete after about three days. This can be accelerated considerably by storage at elevated temperature.

Such a step may involve treating a metallized article made of ABS plastic at elevated temperature in the range from 50° C. to 80° C. for a period between 5 minutes and 60 minutes, preferably at a temperature of 70° C. The effect of the treatment or storage of the metallized plastic surfaces at elevated temperature is that an initial, relatively low adhesion strength is enhanced further, such that, after process step B i), an adhesion strength of the metal layer applied to the plastic surface which is within the desired range of at least or greater than 0.6 N/mm is achieved.

The process according to the invention thus enables, with good process reliability and excellent adhesion strength of the subsequently applied metal layers, achievement of metallization of electrically nonconductive plastic surfaces of articles. In this context, not just planar plastic surfaces are metallized with high adhesion strength by the process according to the invention; instead, inhomogeneously shaped plastic surfaces are also provided with a homogeneous and strongly adhered metal coating.

EXAMPLES

Example 1

In a plating line, ABS/PC—blend parts (Mini Front Finishers made of Bayblend T45PG) were plated. To achieve this, the line comprised the following process steps: a 390 l tank containing a 40% solution of ethyldiglycol acetate at 25±1° C. (pretreatment step for 7 minutes), a 525 l tank containing a solution of 100 g/l sodium permanganate and 10 g/l sulfuric acid (96%) at 70° C. (comparative acidic etching solution without metal ion according to (iii); etching step instead of inventive process step A) for 10 minutes), a 340 l tank containing a solution made of 25 ml/l (96%) sulfuric acid and 30 ml/l of 30% hydrogen peroxide (process step A ii) at 40° C.), a pre-dip solution (preliminary dipping step, 300 ml/l 36% hydrochloric acid at ambient temperature), an activator bath (process step A iii), colloidal palladium, 40 mg/l, 37° C. for 5 minutes), an accelerator (process step A iv), Adhemax ACC1 of Atotech at 45° C., for 5 minutes), an electroless nickel bath (process step A v), Adhemax Ni LFS of Atotech at 40° C. for 10 minutes) followed by a copper electroplating step for 70 minutes (Cupracid HT from Atotech, 3.5 A/dm2, room temperature; process step B)). Between all steps two rinses with water were used to clean the plastic surface and prevent from drag-in of a solution into a subsequent process bath.

Every day, 2 $m^2$ plastic surface were plated using the described plating line layout. The concentration of the permanganate in the etching step was monitored daily using a photometrical method (absorption at 520 nm). Using the result, consumed permanganate was then replenished. During the first week of operation, no substantial consumption was found. In the second week, about 2.5 kg sodium permanganate were added, 11.5 kg were added in the following week, and almost 23 kg in the fifth week of line operation.

After the fifth week 20 g/l copper-sulfate pentahydrate were added to the acidic etching solution to give the composition of the inventive etching solution containing copper ions as metal ions according to (iii). In the sixth and seventh week of operation, no substantial consumption of permanganate was found anymore. Nevertheless, ABS/PC—blend parts plated during sixth and seventh week were covered with metal completely and with the same high adhesion strength as parts plated during week one to five. Thus, the ABS/PC parts were etched with good quality by the inventive etching solution and method. The consumption of permanganate due to etching was nearly not detectable and consumption of permanganate due to self-decomposition did not occur in the inventive etching solution.

Example 2

In an application laboratory, plastic parts of different composition were plated: ABS (Novodur P2MC) and ABS-PC-blends (Bayblend T45PG). Two 70 l tanks were used, containing a 40% solution of ethyldiglycol acetate at 25° C. for ABS-PC, and a solution of 10% butylglycol and 15% ethyldiglycol acetate at 45° C. for the ABS. The ABS-PC parts were pre-treated in its respective solution for 7 minutes and the ABS parts were pre-treated in its respective solution for 10 minutes (pretreatment step). A 170 l etching tank contained an acidic permanganate solution (100 g/l sodium permanganate, 10 g/l 96% sulfuric acid, 70° C.). All plastic parts were treated with the acidic permanganate solution (comparative acidic etching solution without metal ion according to (iii); etching step instead of inventive process step A)) for 10 minutes. All further process steps were the same as are already described in example 1, just in smaller volumes of 70l.

After one week of plating, about 5 kg wet manganese dioxide sludge had to be removed from the bottom of the etching tank. The sludge influenced the etching process leading to some skip plating in subsequent process steps. After cleaning the tank and removing manganese dioxide from the tank walls using acidic hydrogen peroxide solution, the etching solution was pumped back into the tank. 20 g/l copper-sulfate pentahydrate were added to the acidic etching solution to give the composition of the inventive etching solution containing copper ions as metal ions according to (iii). After one week operation, the inventive acidic etching solution again was pumped out. Only traces of manganese dioxide sludge were found. Thus, the decrease of consumption of permanganate shown in Example 1 is accompanied by a decrease of formation of manganese dioxide.

Example 3

In a production line, ABS plastic substrates were plated. To achieve this, a 3500l tank was filled with a solution of 10% butylglycol and 15% ethyldiglycol acetate and held at 45° C. and the substrates treated therein (pretreatment step for 10 minutes). After one rinse step with water, the plastic substrates were treated in a 4800l tank holding a solution of 100 g/l sodium permanganate and 10 g/l sulfuric acid at 70° C. (comparative acidic etching solution without metal ion according to (iii); etching step instead of inventive process step A)) for 10 minutes. This tank was connected to a lamellar clarifier (350l volume) to separate sludge from the solution. After one rinse, the plastic substrates were treated in an alkaline permanganate solution at 60° C. (30 g/l NaMnO4 and 20 g/l NaOH) for 10 minutes; process step A °i)). The plastic surfaces were then cleaned from manganese dioxide using acidic hydrogen peroxide (25 ml/l 96% sulfuric acid and 30 ml/l of 30% hydrogen peroxide at 40° C.; process step A ii)). Subsequently, the plastic substrates were preliminarily dipped as specified in Example 1 (preliminary dipping step) and activated in a palladium colloid (100 mg/l palladium, NeoLink Activator, Atotech product) at 45° C. (process step A iii)). To obtain an electrically conductive layer of the deposited palladium colloid, the substrates were dipped into a conversion solution based on copper ions (NeoLink from Atotech, process step A iv)) for 3 minutes at 55° C. All substrates were copper-plated by introducing them into a copper electroplating bath (Cupracid Ultra, from Atotech, process step B)) at 20° C. for 60 minutes and applying 3.5 A/dm$^2$ of current.

After one week operation and processing of only 3 m$^2$ plastic surface, about 30 kg manganese dioxide sludge were separated by the lamellar clarifier.

After the first week, 20 g/l copper-sulfate pentahydrate were added to the acidic etching solution to give the composition of the inventive etching solution containing copper ions as metal ions according to (iii). In the following week about 15 m$^2$ ABS plastic substrates were etched. After this week, only traces of manganese dioxide sludge were found.

Example 4

As shown by the preceding examples, permanganate of the inventive acidic etching solution is predominantly consumed for etching the surfaces of the plastic substrates. As a result, manganese dioxide is formed which separates into the etching solution. In the presence of acid manganese dioxide catalyzes the oxidation of water, producing more manganese dioxide. In this process, oxygen is liberated. Therefore, the evolved oxygen is an indicator for the decomposition reaction of permanganate.

A round bottomed glass flask with a total volume of about one liter was closed with a glass stopper having an outlet for evolved gas. A silicon tube from the outlet lead into a water bath where a graduated glass cylinder filled with water was placed upside-down to collect all gas evolved. The round bottomed flask was placed in a beaker with water held at 70° C. Exactly 600 ml of a pre-heated permanganate solution (100 g/l sodium permanganate, 10 g/l 96% sulfuric acid) were placed into the glass flask. In this permanganate solution, 3 dm$^2$ of pre-treated ABS plastic substrate were previously etched for ten minutes (comparative acidic etching solution without metal ion according to (iii); etching step instead of inventive process step A)). The substrate was removed from the permanganate solution. The stopper was applied to the flask, and after allowing some minutes for adjusting temperatures, the evolved gas was collected.

Figure 1:
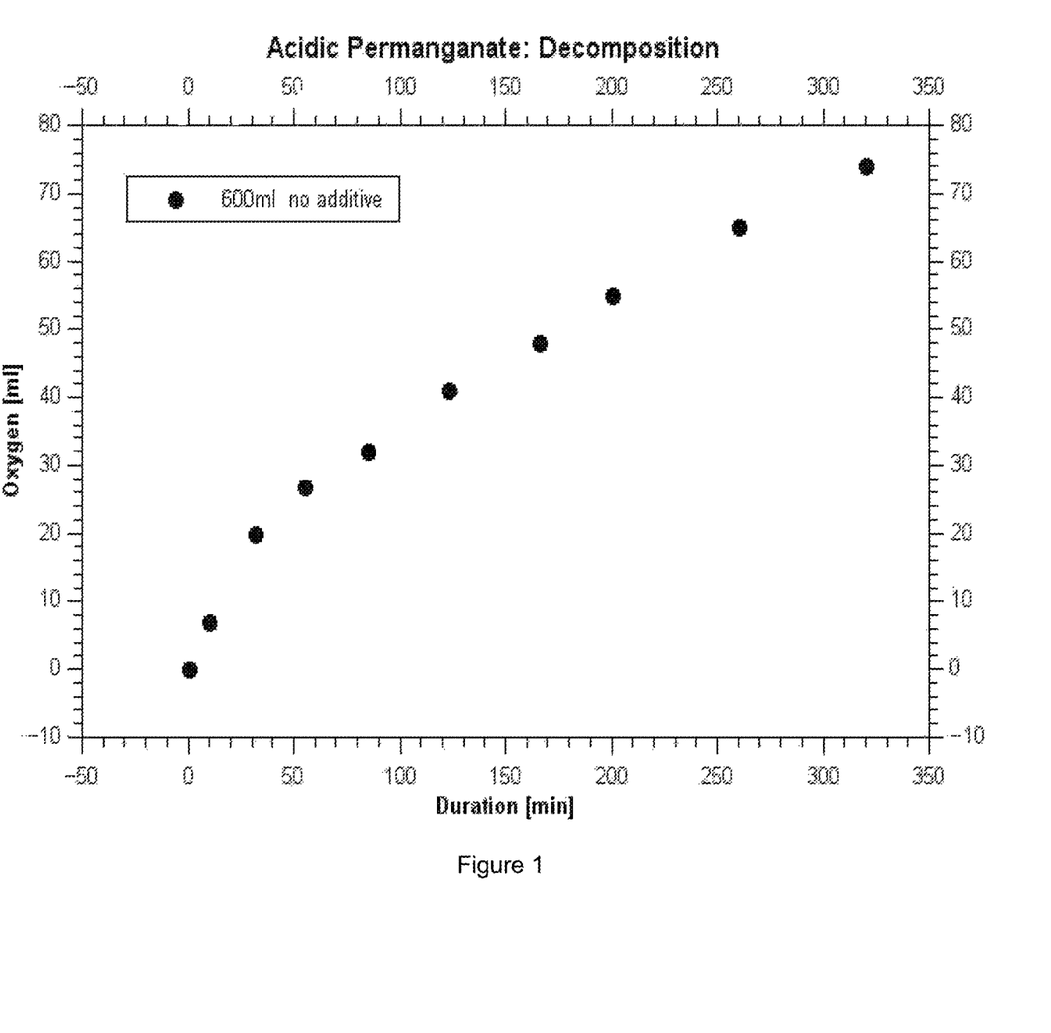
FIG. 1: Evolution of oxygen in a comparative acidic permanganate solution containing no metal ions according to (iii).

The amounts of oxygen collected during specific time intervals are summarized in Table 1 and the data of the first trial are shown in FIG. 1.

Figure 2:
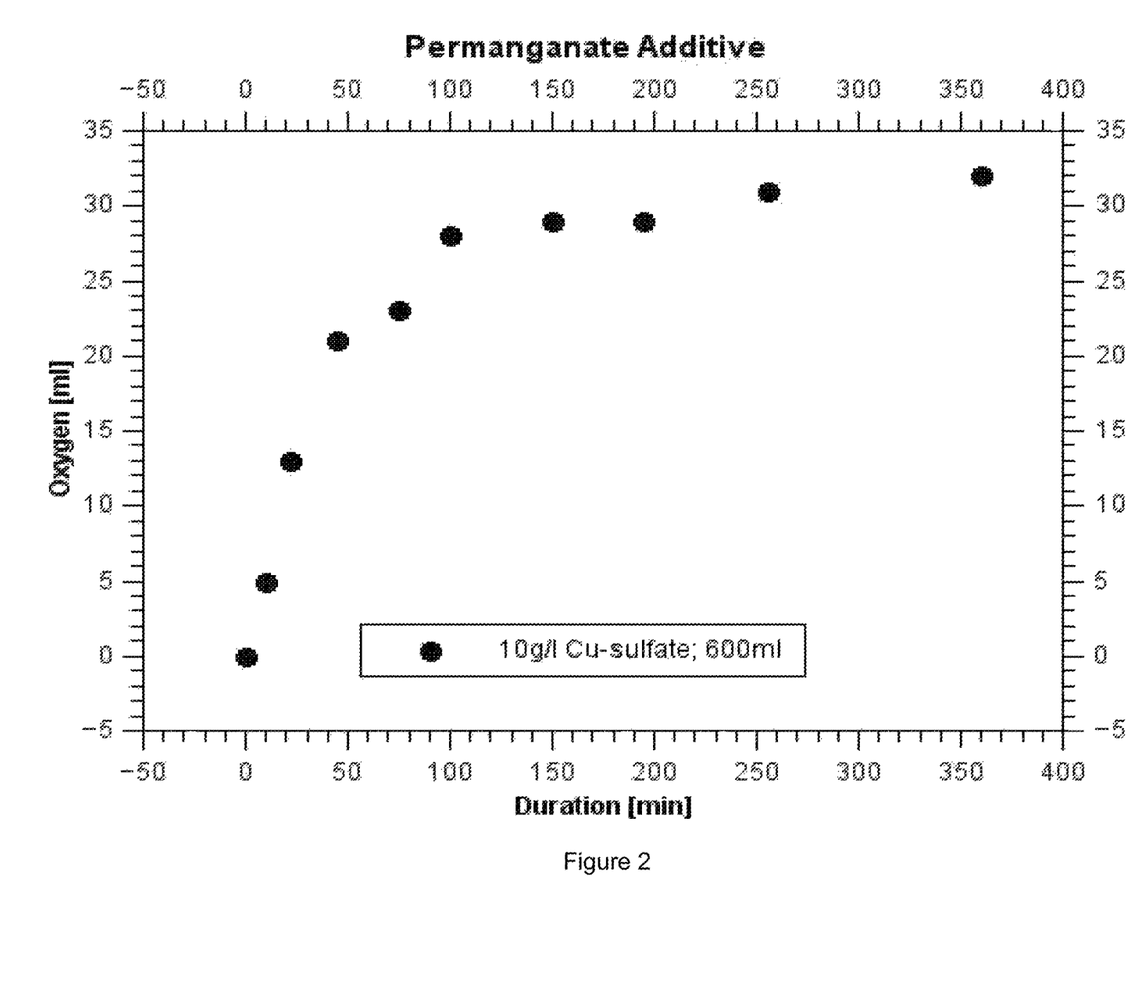
FIG. 2: Evolution of oxygen in an inventive acidic permanganate solution containing metal ions according to (iii).

The trial was repeated. This time the acidic permanganate solution contained 10 g/l copper sulfate pentahydrate and thus corresponded to the inventive etching solution containing copper ions as metal ions according to (iii). The amounts of oxygen collected during specific time intervals are summarized in Table 2 and the data of the first trial are shown in FIG. 2.

In the comparative acidic permanganate solution the oxygen evolution steadily continued and the amount of oxygen generated was significantly higher than in the inventive acidic permanganate solution containing metal ions according to (iii). In addition, the evolution of oxygen approached a threshold value in the inventive permanganate solution. Thus, after some time the gas evolution ceased in the inventive permanganate solution.

TABLE 1

Oxygen evolution in acidic permanganate solution without metal ion according to (iii)

| | Duration [min] | | | | | | | | |
|---|---|---|---|---|---|---|---|---|---|
| | 0 | 10 | 32 | 55 | 85 | 123 | 166 | 200 | 260 | 320 |
| Oxygen [ml] | 0 | 7 | 20 | 27 | 32 | 41 | 48 | 55 | 65 | 74 |

TABLE 2

Oxygen evolution in acidic permanganate solution with metal ion according to (iii)

| | Duration [min] | | | | | | | | |
|---|---|---|---|---|---|---|---|---|---|
| | 0 | 22 | 45 | 75 | 100 | 150 | 195 | 255 | 320 |
| Oxygen [ml] | 5 | 13 | 21 | 23 | 28 | 29 | 29 | 31 | 32 |

Example 5

Adhesion Strength of Metal Layers Deposited on Etched Plastic Surfaces

Four ABS/PC—blend parts (Mini Front Finishers made of Bayblend T45PG) were dipped for 7 minutes into a solution of 40% solution of ethyldiglycol acetate at 25±1° C. (pretreatment step). All parts were rinsed under running water for one minute. Subsequently, parts 1 and 3 were introduced into a bath of 100 g/l sodium permanganate and 10 g/l 96% sulphuric acid (comparative acidic etching solution without metal ion according to (iii); etching step instead of inventive process step A)) for 10 minutes. Meanwhile, parts 2 and 4 were immersed in an a bath of 100 g/l sodium permanganate, 10 g/l 96% sulphuric acid and 20 g/l copper-sulfate pentahydrate, which was kept at 70° C. (inventive acidic etching solution; process step A)). Afterwards parts 3 and 4 were subjected to a further etching in alkaline permanganate solution at 60° C. (30 g/l NaMnO$_4$ and 20 g/l NaOH) for 10 minutes; process step A °i)).

Then all parts were cleaned to remove deposited manganese dioxide in a solution of 50 g/l 96% sulphuric acid and 30 ml/l 30% hydrogen peroxide (process step A ii)). After brief dipping into a solution of 300 ml/l 36% hydrochloric acid (process step preliminary dipping), the parts 1 and 2 were activated in a colloidal activator based on a palladium colloid (Adhemax Aktivator PL from Atotech, 25 ppm of palladium) at 45° C. for three minutes (process step A °iii)). Parts 3 and 4 were activated in the same way (Adhemax Aktivator PL from Atotech, 100 ppm of palladium).

From parts 1 and 2 the protective shells of the palladium particles were removed at 50° C. for five minutes (Adhemax ACC1 accelerator from Atotech, process step A °iv)). Parts 1 and 2 were subsequently nickel-plated at 45° C. without external current for ten minutes (Adhemax LFS, from Atotech, process step A °v)) and rinsed.

To obtain an electrically conductive layer of the deposited palladium colloid, parts 3 and 4 were dipped into a conversion solution based on copper ions (NeoLink from Atotech, process step A iv)) for 3 minutes at 55° C.

All parts were copper-plated by introducing them into a copper electroplating bath (Cupracid Ultra, from Atotech, process step B)) at 20° C. for 60 minutes and applying 3.5 A/dm$^2$ of current.

All parts were stored at 80° C. for 30 minutes (process step B i)). Subsequently, a knife was used to cut out a strip of the metallized plastic panel of a width of about 1 cm, and a tensile tester (from Instron) was used to pull the metal layer away from the plastic (ASTM B 533 1985 Reapproved 2009). The adhesion strengths obtained are summarized in Table 3.

TABLE 3

Adhesion strength of metal layers deposited on plastic surfaces differently etched

| Permanganate etching solution | Metallizing | Metal ions according to (iii) | Adhesion strength [N/mm] |
|---|---|---|---|
| Acidic | 1. Electroless deposition | without | 1.21 |
|  | 2. Electrodeposition | with | 1.11 |
| 1. Acidic | Direct electrodeposition | without | 1.25 |
| 2. Alkaline |  | with | 1.18 |

Example 6

A panel made of ABS (Novodur P2MC) with dimensions of 15 cm×5 cm×0.3 cm was dipped into a solution of 15% diethylene glycol ethylether acetate and 10% ethylene glycolmonobutylether at 45° C. for 10 minutes (pretreatment step). The solution had been adjusted to pH 7 with a potassium phosphate buffer. The panel was rinsed with cold water and afterwards immersed in a bath of 100 g/l sodium permanganate and 10 g/l 96% sulphuric acid and 10 g/l copper sulphate pentahydrate, which was kept at 70° C. (inventive acidic etching solution; process step A)) for 10 minutes. After a further rinsing step, the panel was dipped into a solution of 5 g/l sodium sulfide at 40° C. for 3 minutes in order to obtain an electrically conductive layer (process step A iv)). The colour of the panel surface changed from dark brown to beige yellow. Subsequently, the panel was subjected to a Watts nickel electroplating bath and electrically connected with an electrical current source. Voltage between the panel and an anode was adjusted to 3.5 V. The panel was electroplated with nickel for 6 minutes (process step B)) and rinsed. Afterwards, the panel was electroplated with copper in an acidic copper bath (Cupracid 210, product of Atotech Deutschland GmbH) at 20° C. for 60 minutes by applying 3.5 A/dm$^2$ of current (process step B)). The nickel layer and copper layer completely covered the panel surface and had no defects.

Example 7

Example 6 was repeated using a panel made of ABS/PC (Bayblend T45) having the same dimensions as the panel used in Example 6. After deposition of the copper layer, the ABS/PC panel was stored at 70° C. for 60 minutes (process step B i)). Subsequently, the adhesion strength of the deposited layer stack of nickel and copper was measured as described in Example 5. The adhesion strength was between 0.7 and 0.9 N/mm.

Example 8

A panel made of ABS (Polylac 727, product of Chi Mei Corp.) with dimensions of 15 cm×5 cm×0.3 cm was dipped into a solution of 40 vol % diethylene glycol ethylether acetate at 22° C. for 10 minutes (pretreatment step). Afterwards, the panel was treated with a sulfide solution and electroplated with nickel and copper as described in Example 6. Subsequently, the adhesion strength of the deposited layer stack of nickel and copper was measured as described in Example 5. The adhesion strength was between 0.8 and 1.1 N/mm.

Example 9

Parts of a tubing made of a copolymer of HFP and VDF (Viton, product of DuPont) were slipped over the contacts of a PVC-coated holding rack (process step prior to pretreatment step). The tubing covered the joints between the metallic contacts and the PVC coat. The part of the metallic contacts used for fastening the articles to be plated were left free of the tubing. The tubing parts had a length of about 5 mm. For this example, an old holding rack having a particularly strong tendency to rack metallization was selected. An ABS moulding was fastened to the contacts of the holding rack. The moulding and the rack were treated as described in Example 6. The ABS moulding was completely covered with a nickel layer and a copper layer without any defects, while the rack was free of any metal deposit.

Example 10

Four ABS mouldings (valve caps made of Polylac 727, product of Shimei Corp.) were dipped into a solution of 15% diethylene glycol ethylether acetate and 10% ethylene glycolmonobutylether at 45° C. for 2 minutes (pretreatment step). The solution had been adjusted to pH 7 with a potassium phosphate buffer. Afterwards, the mouldings were rinsed thoroughly with cold water.

The mouldings (1 to 4) were immersed in solutions according to the invention (process step A)) being composed of 10 g/l 96% sulphuric acid, 20 g/l copper-sulfate pentahydrate and varying concentrations of sodium permanganate (see Table 4). The inventive etching solutions had a temperature of 70° C. Mouldings 1 to 4 were treated with the inventive etching solutions for 10 minutes.

Afterwards, the mouldings were cleaned to remove deposited manganese dioxide in a solution of 50 g/l 96% sulphuric acid and 30 ml/l 30% hydrogen peroxide (process step A ii)). After brief dipping into a solution of 300 ml/l 36% hydrochloric acid (process step preliminary dipping), the mouldings were activated in a colloidal activator based on a palladium colloid (Adhemax Aktivator PL from Atotech, 25 ppm of palladium) at 45° C. for five minutes (process step A °iii)). The protective shells of the palladium particles were removed at 40° C. for five minutes (Adhemax ACC1 accelerator from Atotech, process step A °iv)). The mouldings were subsequently nickel-plated at 40° C. without external current for ten minutes (Adhemax LFS, from Atotech, process step A °v)) and rinsed. Subsequently, the mouldings were copper-plated by introducing them into a copper electroplating bath (Cupracid 5000, from Atotech, process step B)) at 25° C. for 60 minutes and applying 4 A/dm$^2$ of current.

The mouldings were stored at 80° C. for 30 minutes (process step B i)). Then, the adhesion strength of the deposited metal layer was measured as described in Example 5. The adhesion strengths obtained are summarized in Table 4.

TABLE 4

Adhesion strength of metal layers deposited on plastic surfaces differently etched

| Permanganate concentration [g/l] | Adhesion strength [N/mm] |
|---|---|
| 10 | 1.59 |
| 20 | 2.07 |
| 30 | 2.17 |

Example 11

Figure 3:
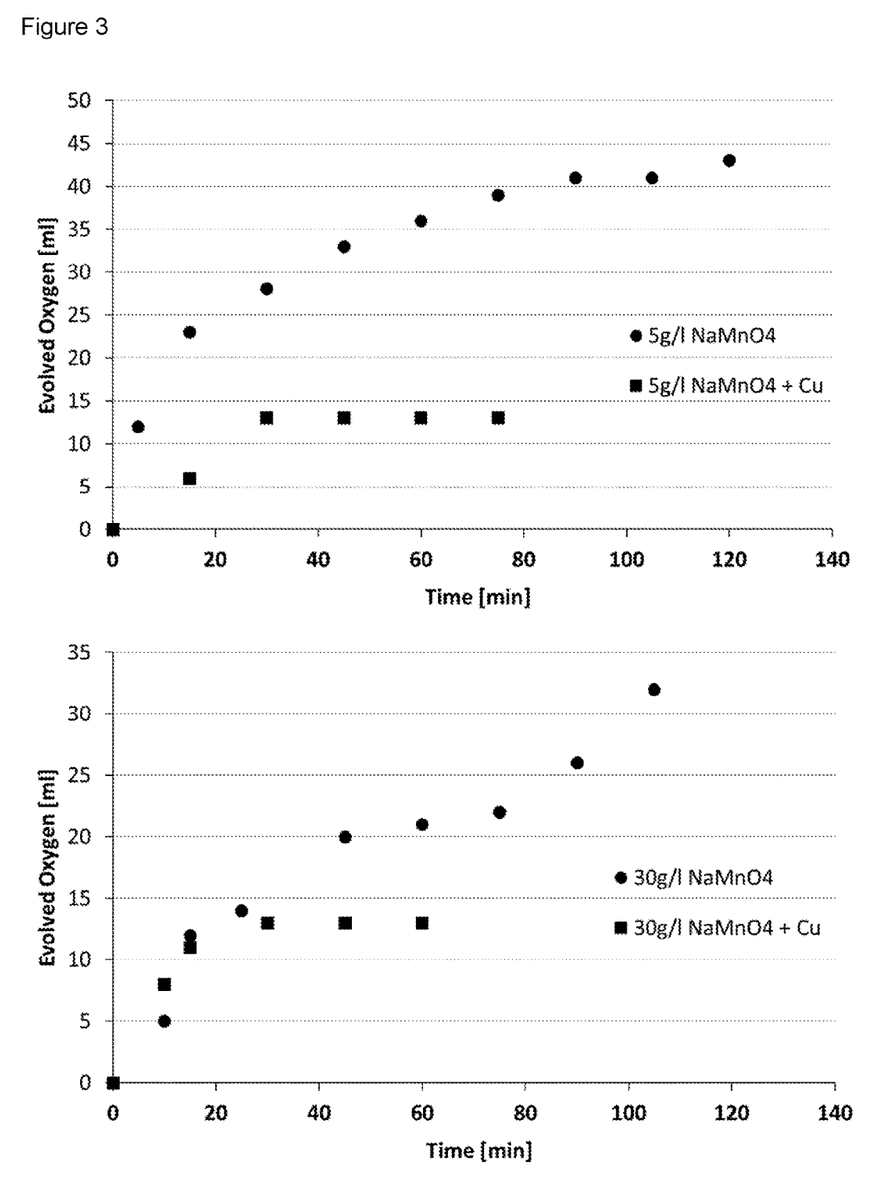
FIG. 3: Evolution of oxygen in solutions containing varying concentrations of permanganate in absence or presence of metal ions according to (iii).

Amounts of oxygen generated in acidic permanganate solutions with varying permanganate concentrations were measured as described in Example 4 in absence and presence of metal ions according to (iii). Concentrations of components of the permanganate solutions and measurement results are summarized in Table 5 and shown in FIG. 3.

TABLE 5

Oxygen evolution in acidic permanganate solution in absence and presence of metal ion according to (iii)

| | Time [min] | | | | | | | | | | |
|---|---|---|---|---|---|---|---|---|---|---|---|
| | 0 | 5 | 10 | 15 | 25 | 30 | 45 | 60 | 75 | 90 | 105 | 120 |

5 g/l NaMnO$_4$, 10 g/l 96% H$_2$SO$_4$

| Oxygen [ml] | 0 | 12 | — | 23 | — | 28 | 33 | 36 | 39 | 41 | 41 | 43 |

5 g/l NaMnO$_4$, 10 g/l 96% H$_2$SO$_4$, 20 g/l CuSO$_4$ × 5H$_2$O

| Oxygen [ml] | 0 | — | — | 6 | — | 13 | 13 | 13 | 13 | — | — | — |

10 g/l NaMnO$_4$, 10 g/l 96% H$_2$SO$_4$

| Oxygen [ml] | 0 | — | — | 13 | — | 18 | 20 | 26 | 32 | 32 | 32 | 32 |

10 g/l NaMnO$_4$, 10 g/l 96% H$_2$SO$_4$, 20 g/l CuSO$_4$ × 5H$_2$O

| Oxygen [ml] | 0 | — | — | 0 | — | 0 | 0 | 0 | 0 | 0 | 0 | 0 |

30 g/l NaMnO$_4$, 10 g/l 96% H$_2$SO$_4$

| Oxygen [ml] | 0 | — | 5 | 12 | 14 | — | 20 | 21 | 22 | 26 | 32 | — |

30 g/l NaMnO$_4$, 10 g/l 96% H$_2$SO$_4$, 12 g/l CuSO$_4$ × 5H$_2$O

| Oxygen [ml] | 0 | — | 8 | 11 | — | 13 | 13 | 13 | — | — | — | — |

"—" means: not measured.

Example 12

Figure 4:
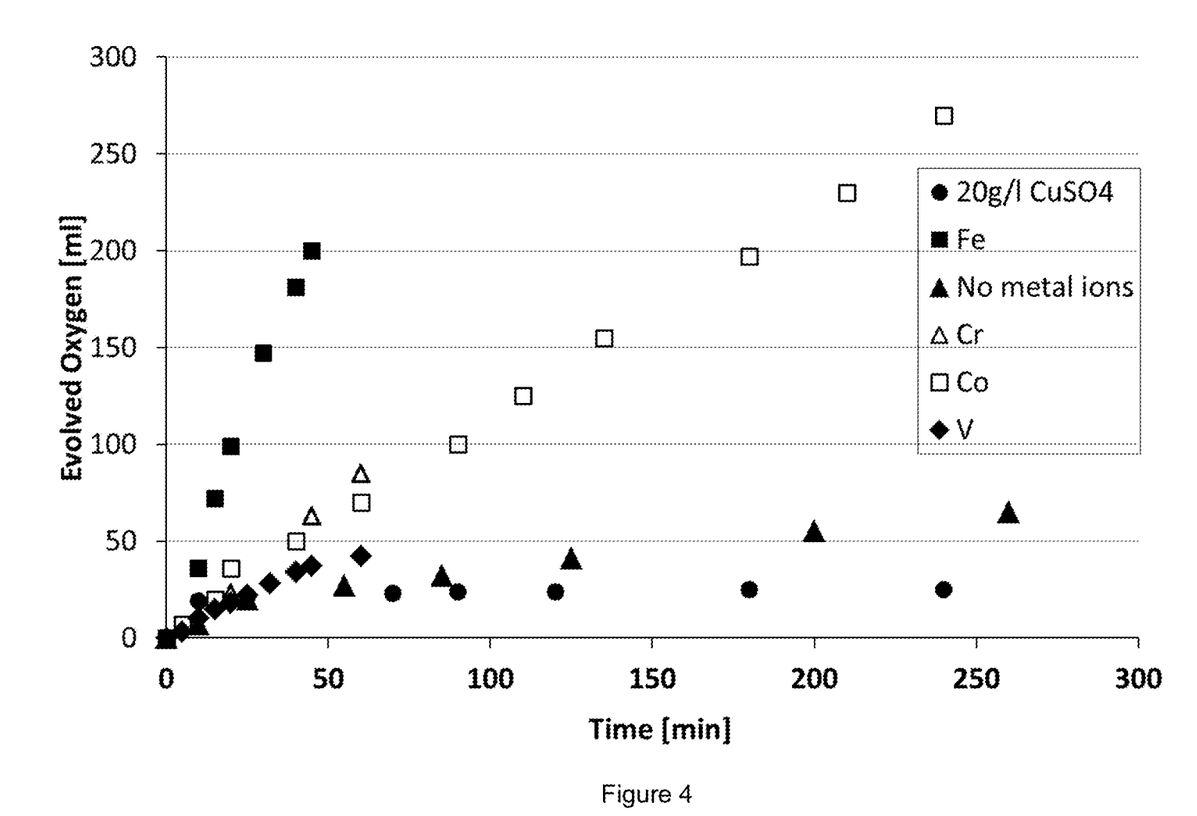
FIG. 4: Evolution of oxygen in comparative acidic permanganate solutions containing metal ions different from metal ions according to (iii)

Amounts of oxygen generated in acidic permanganate solutions were measured as described in Example 4 in absence and presence of metal ions according to (iii) (according to invention) and in presence of metal ions different from metal ions according to (iii) (comparative). Concentrations of components of the permanganate solutions and measurement results are summarized in Table 6 and shown in FIG. 4.

TABLE 6

Oxygen evolution in acidic permanganate solution in absence and presence of metal ion according to (iii)

100 g/l NaMnO$_4$, 10 g/l 96% H$_2$SO$_4$

| | Time [min] | | | | | | | |
|---|---|---|---|---|---|---|---|---|
| | 0 | 10 | 25 | 55 | 85 | 125 | 200 | 260 |
| Oxygen [ml] | 0 | 7 | 20 | 27 | 32 | 41 | 55 | 65 |

100 g/l NaMnO$_4$, 10 g/l 96% H$_2$SO$_4$, 10 g/l CuSO$_4$ × 5H$_2$O

| | Time [min] | | | | | | | |
|---|---|---|---|---|---|---|---|---|
| | 0 | 10 | 30 | 50 | 60 | 140 | 200 | 240 |
| Oxygen [ml] | 0 | 21 | 24 | 26 | 26 | 29 | 30 | 30 |

TABLE 6-continued

Oxygen evolution in acidic permanganate solution in absence and presence of metal ion according to (iii)

100 g/l NaMnO$_4$, 10 g/l 96% H$_2$SO$_4$, 20 g/l CuSO$_4$ × 5H$_2$O

| | Time [min] | | | | | | | |
|---|---|---|---|---|---|---|---|---|
| | 0 | 10 | 25 | 70 | 90 | 120 | 180 | 240 |
| Oxygen [ml] | 0 | 19 | 22 | 23 | 24 | 24 | 25 | 25 |

100 g/l NaMnO$_4$, 10 g/l 96% H$_2$SO$_4$, 3 g/l NaVO$_3$

| | Time [min] | | | | | | | | |
|---|---|---|---|---|---|---|---|---|---|
| | 0 | 5 | 10 | 15 | 20 | 25 | 32 | 40 | 45 | 60 |
| Oxygen [ml] | 0 | 3 | 10 | 15 | 18 | 22 | 28 | 34 | 37 | 42 |

100 g/l NaMnO$_4$, 10 g/l 96% H$_2$SO$_4$, 20 g/l CoSO$_4$ × 7H$_2$O

| | Time [min] | | | | | | | | | |
|---|---|---|---|---|---|---|---|---|---|---|
| | 0 | 5 | 15 | 20 | 40 | 60 | 90 | 110 | 135 | 180 | 210 | 240 |
| Oxygen [ml] | 0 | 7 | 20 | 36 | 50 | 70 | 100 | 125 | 155 | 197 | 230 | 270 |

100 g/l NaMnO$_4$, 10 g/l 96% H$_2$SO$_4$, 10 g/l CrO$_3$

| | Time [min] | | | |
|---|---|---|---|---|
| | 0 | 20 | 45 | 60 |
| Oxygen [ml] | 0 | 23 | 63 | 85 |

100 g/l NaMnO$_4$, 10 g/l 96% H$_2$SO$_4$, 10 g/l Fe$_2$(SO$_4$)$_3$ × 9H$_2$O

| | Time [min] | | | | | |
|---|---|---|---|---|---|---|
| | 0 | 10 | 15 | 20 | 30 | 40 | 45 |
| Oxygen [ml] | 0 | 36 | 72 | 99 | 147 | 181 | 200 |

"—" means: not measured.

16.2 g/l palladium(II)sulfate were added to a solution composed of 100 g/l sodium permanganate and 10 g/l 96% sulphuric acid. Thereupon, the solution decomposed nearly explosively.

The invention claimed is:

1. Process for etching electrically nonconductive plastic surfaces of articles, comprising the process step of:
   A) treating the plastic surface with at least one etching solution for treating nonconductive plastic surfaces, the etching solution comprising
      (i) at least one acid,
      (ii) at least one permanganate salt selected from alkali metal permanganates and earth alkali metal permanganates, and
      (iii) at least one source for a metal ion, wherein the metal of the metal ion is selected from titanium, zirconium, niobium, molybdenum, ruthenium, rhodium, nickel, copper, silver, zinc and cadmium,
   characterized in that the molar ratio of permanganate ions according to (ii) to metal ions according to (iii) ranges from 8.75:1 to 40:1.

2. Process according to claim 1, characterized in that the plastic surface has been manufactured from at least one electrically nonconductive plastic and the at least one electrically nonconductive plastic is selected from the group comprising an acrylonitrile-butadiene-styrene copolymer, a polyamide, a polycarbonate and a mixture of an acrylonitrile-butadiene-styrene copolymer with at least one further polymer.

3. Process according to claim 1, characterized in that the following further process step is performed after process step A) and, if process step B) is performed, prior to process step B):
   A i) treating the plastic surface with an alkaline etching solution.

4. Process according to claim 1, characterized in that the following further process step is performed after process step A) and, if process step B) is performed, prior to process step B):
   A ii) treating the plastic surface in a solution comprising a reducing agent for manganese dioxide.

5. Process for metallizing electrically nonconductive plastic surfaces of articles, comprising the process steps of:
   A) treating the plastic surface with at least one etching solution for treating nonconductive plastic surfaces, the etching solution comprising
      (i) at least one acid,
      (ii) at least one permanganate salt selected from alkali metal permanganates and earth alkali metal permanganates, and
      (iii) at least one source for a metal ion, wherein the metal of the metal ion is selected from titanium, zirconium, niobium, molybdenum, ruthenium, rhodium, nickel, copper, silver, zinc and cadmium, and

B) metallizing the plastic surface with a metallizing solution, characterized in that the molar ratio of permanganate ions according to (ii) to metal ions according to (iii) ranges from 8.75:1 to 40:1.

6. The process according to claim 5, characterized in that process step A) is preceded by performance of the following further process step:

pretreatment step: treating the plastic surface in an aqueous solution comprising at least one glycol compound.

7. Process according to claim 6, characterized in that the at least one glycol compound is selected from compounds of the general formula (I)

Formel (I)

wherein n is an integer from 1 to 4; and

R1 and R2 are each independently —H, —CH3, —CH2-CH3, —CH2-CH2-CH3, —CH(CH3)-CH3, —CH2-CH2-CH2-CH3, —CH(CH3)-CH2-CH3, —CH2-CH(CH3)-CH3, —CH2-CH2-CH2-CH2-CH3, —CH(CH3)-CH2-CH2-CH3, —CH2-CH(CH3)-CH2-CH3, —CH2-CH2-CH(CH3)-CH3, —CH(CH2-CH3)-CH2-CH3, —CO—CH3, —CO—CH2-CH3, —CO—CH2-CH2-CH3, —CO—CH(CH3)-CH3, —CO—CH(CH3)-CH2-CH3, —CO—CH2-CH(CH3)-CH3, —CO—CH2-CH2-CH2-CH3.

8. Process according to claim 5, characterized in that the following further process step is performed between process steps A) and B):

A iii) treating the plastic surface with a solution of a metal colloid or of a compound of a metal, the metal being selected from the metals of transition group I of the Periodic Table of the Elements and transition group VIII of the Periodic Table of the Elements.

9. Process according to claim 5, characterized in that the following further process step is performed between process steps A) and B):

A iv) treating the plastic surfaces in a conversion solution.

10. Process according to claim 5, characterized in that the following alternative process step is performed between process steps A) and B):

A iv) treating the plastic surfaces in a sulfide containing solution.

11. Process according to claim 5, characterized in that the following process step is performed prior to process step A):

Slipping stripes of a plastic material not being etched by the at least one etching solution over a plastic coat of a rack, the rack holding the articles having nonconductive plastic surfaces.

12. Process according to claim 5, characterized in that the plastic surface has been manufactured from at least one electrically nonconductive plastic and the at least one electrically nonconductive plastic is selected from the group comprising an acrylonitrile-butadiene-styrene copolymer, a polyamide, a polycarbonate and a mixture of an acrylonitrile-butadiene-styrene copolymer with at least one further polymer.

13. Process according to claim 5, characterized in that the following further process step is performed after process step A) and, if process step B) is performed, prior to process step B):

A i) treating the plastic surface with an alkaline etching solution.

14. Process according to claim 5, characterized in that the following further process step is performed after process step A) and, if process step B) is performed, prior to process step B):

A ii) treating the plastic surface in a solution comprising a reducing agent for manganese dioxide.

* * * * *